United States Patent
Al-Yami et al.

(10) Patent No.: US 10,876,028 B2
(45) Date of Patent: Dec. 29, 2020

(54) ENHANCED FILTRATION CONTROL PACKAGES, WELLBORE SERVICING FLUIDS UTILIZING THE SAME, AND METHODS OF MAINTAINING THE STRUCTURE OF A WELLBORE

(71) Applicant: Saudi Arabian Oil Company, Dhahran (SA)

(72) Inventors: Abdullah Al-Yami, Dhahran (SA); Vikrant Wagle, Abqaiq (SA); Hussain AlBahrani, Qatif (SA); Ali Safran, Dhahran (SA); Nasser AlHareth, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/381,788

(22) Filed: Apr. 11, 2019

(65) Prior Publication Data

US 2019/0233708 A1 Aug. 1, 2019

Related U.S. Application Data

(63) Continuation of application No. 15/489,927, filed on Apr. 18, 2017, now Pat. No. 10,487,254.

(Continued)

(51) Int. Cl.
*C09K 8/035* (2006.01)
*C09K 8/24* (2006.01)
(Continued)

(52) U.S. Cl.
CPC ............ *C09K 8/24* (2013.01); *B01F 17/0021* (2013.01); *B01F 17/0042* (2013.01); *B01F 17/0092* (2013.01); *C04B 7/527* (2013.01); *C04B 14/06* (2013.01); *C04B 24/02* (2013.01); *C04B 24/026* (2013.01); *C04B 24/085* (2013.01); *C04B 28/02* (2013.01); *C04B 28/04* (2013.01); *C04B 28/08* (2013.01); *C04B 38/02* (2013.01); *C09K 8/032* (2013.01); *C09K 8/035* (2013.01); *C09K 8/04* (2013.01); *C09K 8/08* (2013.01); *C09K 8/20* (2013.01); *C09K 8/22* (2013.01); *C09K 8/32* (2013.01); *C09K 8/36* (2013.01); *C09K 8/40* (2013.01); *C09K 8/424* (2013.01); *C09K 8/46* (2013.01); *C09K 8/467* (2013.01); *C09K 8/48* (2013.01); *C09K 8/487* (2013.01); *C09K 8/74* (2013.01); *C10M 105/18* (2013.01); *C10M 105/62* (2013.01); *C10M 107/34* (2013.01); *C10M 111/04* (2013.01); *C10M 173/00* (2013.01); *C10M 173/02* (2013.01); *E21B 21/00* (2013.01); *E21B 21/002* (2013.01); *E21B 21/003* (2013.01); *E21B 33/14* (2013.01); *E21B 43/25* (2013.01); *C04B 2103/40* (2013.01);

(Continued)

(58) Field of Classification Search
CPC ............... C09K 8/035; C09K 2208/22; C09K 2208/32; C09K 8/524; C09K 8/54; C09K 8/68; C09K 8/70; C09K 8/92; C09K 15/12; C09K 2208/28; C09K 8/42; C09K 8/52; C09K 8/532; C09K 8/588; C09K 8/594; C09K 8/62; C09K 8/94; C09K 15/06; C09K 15/08; C09K 15/20; C09K 15/22; C09K 15/28; C09K 15/30; C09K 17/18; C09K 17/32; C09K 17/40; C09K 2208/10; C09K 2208/20; C09K 8/12; C09K 8/38; C09K 8/512; C09K 8/516; C09K 8/528; C09K 8/58; C09K 8/584; C09K 8/602; C09K 8/66; C09K 8/685; C09K 8/703; C09K 8/72; C09K 8/80; C09K 8/86; C09K 8/88; C09K 8/887; C09K 8/905

See application file for complete search history.

(56) References Cited

U.S. PATENT DOCUMENTS 2,589,949 A 3/1952 Meadors
2,782,163 A 2/1957 Doyne
(Continued)

FOREIGN PATENT DOCUMENTS

AU 5117264 A 5/1967
CA 2495811 A1 3/2004
(Continued)

OTHER PUBLICATIONS

U.S. Office Action dated Jul. 3, 2019 pertaining to U.S. Appl. No. 15/496,794, filed Apr. 25, 2017, 52 pgs.
(Continued)

*Primary Examiner* — Kumar R Bhushan
(74) *Attorney, Agent, or Firm* — Dinsmore & Shohl LLP

(57) ABSTRACT

A wellbore servicing fluid comprises an aqueous base fluid, one or more alkali metal or alkali earth metal salts, at least one visocisifier, and a filtration control package. The filtration control package may comprise a carboxylic acid and an ethoxylated alcohol compound. Alternatively, the filtration control package may comprise a polyethylene glycol. The carboxylic acid may have from 8 to 20 carbon atoms. The ethoxylated alcohol compound may have a general formula $R—(OCH_2CH_2)_x—OH$, where R is a hydrocarbon having from 10 to 16 atoms and x is an integer from 6 to 9. The ethoxylated alcohol compound may have a hydrophilic-lipophilic balance of from 8.0 to 16.0. The polyethylene glycol may have a mass average molar mass ($M_w$) of less than or equal to 1500 daltons.

6 Claims, No Drawings

Related U.S. Application Data

(60) Provisional application No. 62/454,189, filed on Feb. 3, 2017, provisional application No. 62/454,192, filed on Feb. 3, 2017.

(51) Int. Cl.

| | | |
|---|---|---|
| *E21B 21/00* | (2006.01) | |
| *C09K 8/22* | (2006.01) | |
| *C09K 8/467* | (2006.01) | |
| *C10M 173/00* | (2006.01) | |
| *C04B 24/02* | (2006.01) | |
| *C04B 28/02* | (2006.01) | |
| *C04B 28/04* | (2006.01) | |
| *C04B 28/08* | (2006.01) | |
| *C09K 8/74* | (2006.01) | |
| *E21B 43/25* | (2006.01) | |
| *C09K 8/03* | (2006.01) | |
| *C09K 8/20* | (2006.01) | |
| *B01F 17/00* | (2006.01) | |
| *C09K 8/40* | (2006.01) | |
| *E21B 33/14* | (2006.01) | |
| *C09K 8/08* | (2006.01) | |
| *C09K 8/42* | (2006.01) | |
| *C09K 8/48* | (2006.01) | |
| *C04B 24/08* | (2006.01) | |
| *C09K 8/487* | (2006.01) | |
| *C04B 7/52* | (2006.01) | |
| *C09K 8/46* | (2006.01) | |
| *C09K 8/04* | (2006.01) | |
| *C04B 14/06* | (2006.01) | |
| *C04B 38/02* | (2006.01) | |
| *C10M 105/18* | (2006.01) | |
| *C10M 105/62* | (2006.01) | |
| *C10M 107/34* | (2006.01) | |
| *C10M 111/04* | (2006.01) | |
| *C09K 8/32* | (2006.01) | |
| *C09K 8/36* | (2006.01) | |
| *C10M 173/02* | (2006.01) | |
| *C10N 20/02* | (2006.01) | |
| *C10N 20/04* | (2006.01) | |
| *C10N 20/00* | (2006.01) | |
| *C10N 30/06* | (2006.01) | |
| *C10N 40/22* | (2006.01) | |
| *C10N 50/00* | (2006.01) | |
| *C10N 40/00* | (2006.01) | |
| *C09K 8/514* | (2006.01) | |
| *C09K 8/28* | (2006.01) | |
| *C04B 103/40* | (2006.01) | |
| *C04B 103/46* | (2006.01) | |
| *C04B 111/00* | (2006.01) | |

(52) U.S. Cl.
CPC . *C04B 2103/46* (2013.01); *C04B 2111/00068* (2013.01); *C04B 2201/20* (2013.01); *C09K 8/03* (2013.01); *C09K 8/28* (2013.01); *C09K 8/514* (2013.01); *C09K 2208/12* (2013.01); *C09K 2208/34* (2013.01); *C10M 2201/062* (2013.01); *C10M 2201/08* (2013.01); *C10M 2201/103* (2013.01); *C10M 2207/003* (2013.01); *C10M 2207/046* (2013.01); *C10M 2209/104* (2013.01); *C10M 2209/108* (2013.01); *C10M 2209/1045* (2013.01); *C10M 2215/042* (2013.01); *C10M 2215/08* (2013.01); *C10M 2215/265* (2013.01); *C10M 2215/28* (2013.01); *C10M 2217/044* (2013.01); *C10N 2020/017* (2020.05); *C10N 2020/02* (2013.01); *C10N 2020/04* (2013.01); *C10N 2030/06* (2013.01); *C10N 2040/22* (2013.01); *C10N 2040/40* (2020.05); *C10N 2050/013* (2020.05); *Y02W 30/91* (2015.05)

(56) References Cited

U.S. PATENT DOCUMENTS

| | | |
|---|---|---|
| 2,786,027 A | 3/1957 | Salathiel |
| 3,000,826 A | 9/1961 | Gililland |
| 3,044,959 A | 7/1962 | Martin |
| 3,048,538 A | 8/1962 | Rosenberg et al. |
| 3,319,714 A | 5/1967 | Knox |
| 3,353,603 A | 11/1967 | Knight et al. |
| 3,720,610 A | 3/1973 | Erasmus |
| 3,816,351 A | 6/1974 | Lancz |
| 3,849,316 A | 11/1974 | Motley et al. |
| 3,953,337 A | 4/1976 | Walker et al. |
| 4,140,650 A | 2/1979 | Wilde |
| 4,141,843 A | 2/1979 | Watson |
| 4,172,800 A | 10/1979 | Walker |
| 4,217,231 A | 8/1980 | King |
| 4,280,943 A | 7/1981 | Bivens et al. |
| 4,519,923 A | 5/1985 | Hori et al. |
| 4,561,985 A | 12/1985 | Glass, Jr. |
| 4,588,032 A | 5/1986 | Weigand et al. |
| 4,626,362 A | 12/1986 | Dickert et al. |
| 4,658,036 A | 4/1987 | Schilling |
| 4,687,516 A | 8/1987 | Burkhalter et al. |
| 4,704,214 A | 11/1987 | Russell et al. |
| 4,719,021 A | 1/1988 | Branch, III |
| 4,842,065 A | 6/1989 | McClure |
| 5,007,489 A | 4/1991 | Enright et al. |
| 5,016,711 A | 5/1991 | Cowan |
| 5,105,885 A | 4/1992 | Bray et al. |
| 5,109,042 A | 4/1992 | Stephens |
| 5,275,654 A | 1/1994 | Cowan |
| 5,298,070 A | 3/1994 | Cowan |
| 5,314,022 A | 5/1994 | Cowan et al. |
| 5,330,662 A | 7/1994 | Jahnke et al. |
| 5,348,993 A | 9/1994 | Daeumer et al. |
| 5,399,548 A | 3/1995 | Patel et al. |
| 5,474,701 A | 12/1995 | Jaquess et al. |
| 5,586,608 A | 12/1996 | Clark et al. |
| 5,593,953 A | 1/1997 | Malchow |
| 5,593,954 A | 1/1997 | Malchow |
| 5,602,082 A | 2/1997 | Hale et al. |
| 5,618,780 A | 4/1997 | Argillier et al. |
| 5,683,973 A | 11/1997 | Post et al. |
| 5,728,210 A | 3/1998 | Moran et al. |
| 5,744,432 A | 4/1998 | Barnhorst et al. |
| 5,830,831 A | 11/1998 | Chan et al. |
| 5,850,880 A | 12/1998 | Moran et al. |
| 5,996,693 A | 12/1999 | Heathman |
| 6,063,737 A | 5/2000 | Haberman et al. |
| 6,258,756 B1 | 7/2001 | Hayatdavoudi |
| 6,267,716 B1 | 7/2001 | Quintero |
| 6,632,779 B1 | 10/2003 | Vollmer et al. |
| 6,803,346 B1 | 10/2004 | Bailey et al. |
| 6,972,274 B1 | 12/2005 | Slikta et al. |
| 6,974,852 B2 | 12/2005 | Stanger et al. |
| 7,081,438 B2 | 7/2006 | Horton |
| 7,262,152 B2 | 8/2007 | Monfreux-Gaillard et al. |
| 7,318,477 B2 | 1/2008 | Hou |
| 7,435,706 B2 | 10/2008 | Mueller et al. |
| 7,799,742 B2 | 9/2010 | Dino |
| 7,893,010 B2 | 2/2011 | Ali et al. |
| 7,951,755 B2 | 5/2011 | Wu et al. |
| 8,252,728 B2 | 8/2012 | Karagianni et al. |
| 8,403,051 B2 | 3/2013 | Huang et al. |
| 8,563,479 B2 | 10/2013 | Amanullah et al. |
| 8,703,658 B2* | 4/2014 | Smith .................. C09K 8/035 507/136 |
| 8,741,989 B2 | 6/2014 | Martin et al. |
| 8,932,997 B2 | 1/2015 | Merli et al. |
| 8,936,111 B2 | 1/2015 | Maghrabi et al. |
| 9,006,151 B2 | 4/2015 | Amanullah et al. |

(56) References Cited

U.S. PATENT DOCUMENTS

| | | | |
|---|---|---|---|
| 9,034,800 B2 | 5/2015 | Harris et al. |
| 9,127,192 B2 | 9/2015 | Maghrabi et al. |
| 9,175,205 B2 | 11/2015 | Amanullah et al. |
| 9,249,052 B2 | 2/2016 | Kawakami |
| 10,287,476 B2 | 5/2019 | Al-Yami et al. |
| 10,287,477 B2 | 5/2019 | Al-Yami et al. |
| 10,494,559 B2 | 12/2019 | Al-Yami et al. |
| 10,526,520 B2 | 1/2020 | Al-Yami et al. |
| 10,538,692 B2 | 1/2020 | Al-Yami et al. |
| 2001/0027880 A1 | 10/2001 | Brookey |
| 2003/0017953 A1 | 1/2003 | Horton et al. |
| 2003/0127903 A1 | 7/2003 | Quintero |
| 2004/0108113 A1 | 6/2004 | Luke et al. |
| 2004/0116304 A1 | 6/2004 | Wu et al. |
| 2004/0144537 A1 | 7/2004 | Reddy et al. |
| 2005/0049147 A1 | 3/2005 | Patel et al. |
| 2006/0111245 A1 | 5/2006 | Carbajal et al. |
| 2006/0174805 A1 | 8/2006 | Chatterji et al. |
| 2006/0183842 A1 | 8/2006 | Johnson |
| 2006/0254770 A1 | 11/2006 | Hou |
| 2007/0015678 A1 | 1/2007 | Rodrigues et al. |
| 2007/0093393 A1 | 4/2007 | Navarrete et al. |
| 2007/0191235 A1 | 8/2007 | Mas et al. |
| 2008/0006404 A1 | 1/2008 | Reddy et al. |
| 2008/0171671 A1 | 7/2008 | Mueller et al. |
| 2008/0194432 A1 | 8/2008 | Heidlas et al. |
| 2008/0217064 A1 | 9/2008 | Stoian et al. |
| 2008/0308011 A1 | 12/2008 | Brothers et al. |
| 2009/0042746 A1 | 2/2009 | Bailey |
| 2009/0131285 A1 | 5/2009 | Wang et al. |
| 2009/0200033 A1 | 8/2009 | Kakadjian et al. |
| 2009/0260885 A1 | 10/2009 | Pomerleau |
| 2010/0016180 A1 | 1/2010 | Scoggins et al. |
| 2010/0152067 A1 | 6/2010 | McDonald |
| 2010/0152068 A1 | 6/2010 | Hartshorne et al. |
| 2010/0173804 A1 | 7/2010 | Van de Peer et al. |
| 2010/0263863 A1 | 10/2010 | Quintero et al. |
| 2010/0319915 A1 | 12/2010 | Bustos et al. |
| 2010/0326660 A1 | 12/2010 | Ballard et al. |
| 2011/0303414 A1 | 12/2011 | Seth et al. |
| 2011/0306524 A1 | 12/2011 | Smith |
| 2012/0000708 A1 | 1/2012 | van Zanten et al. |
| 2012/0018226 A1 | 1/2012 | Nzeadibe et al. |
| 2012/0241155 A1 | 9/2012 | Ali et al. |
| 2012/0329683 A1 | 12/2012 | Droger et al. |
| 2013/0079256 A1 | 3/2013 | Yang et al. |
| 2013/0092376 A1 | 4/2013 | Al-Subhi et al. |
| 2013/0126243 A1 | 5/2013 | Smith |
| 2013/0153232 A1 | 6/2013 | Bobier |
| 2013/0244913 A1 | 9/2013 | Maberry et al. |
| 2013/0303410 A1 | 11/2013 | Wagle et al. |
| 2013/0303411 A1 | 11/2013 | Wagle et al. |
| 2014/0024560 A1 | 1/2014 | Gonzalez Poche et al. |
| 2014/0024561 A1 | 1/2014 | Reddy |
| 2014/0073540 A1 | 3/2014 | Berry et al. |
| 2014/0102809 A1 | 4/2014 | King et al. |
| 2014/0121135 A1 | 5/2014 | Gamage et al. |
| 2014/0213489 A1 | 7/2014 | Smith |
| 2014/0318785 A1 | 10/2014 | Reddy et al. |
| 2014/0332212 A1 | 11/2014 | Ayers et al. |
| 2015/0024975 A1 | 1/2015 | Wagle et al. |
| 2015/0034389 A1 | 2/2015 | Perez |
| 2015/0080273 A1* | 3/2015 | Hatchman ......... B01D 19/0404 507/219 |
| 2015/0087563 A1* | 3/2015 | Brege ................. C09K 8/035 507/103 |
| 2015/0159073 A1 | 6/2015 | Assmann et al. |
| 2015/0240142 A1 | 8/2015 | Kefi et al. |
| 2015/0299552 A1 | 10/2015 | Zamora et al. |
| 2016/0009981 A1 | 1/2016 | Teklu et al. |
| 2016/0024370 A1 | 1/2016 | Ba geri et al. |
| 2016/0069159 A1 | 3/2016 | Teklu et al. |
| 2016/0090523 A1 | 3/2016 | Ravi et al. |
| 2016/0177169 A1* | 6/2016 | Zhang ................. C09K 8/52 507/261 |
| 2016/0186032 A1 | 6/2016 | Yu et al. |
| 2016/0237340 A1 | 8/2016 | Pandya et al. |
| 2016/0289529 A1 | 10/2016 | Nguyen |
| 2017/0009125 A1 | 1/2017 | Shaffer et al. |
| 2018/0223162 A1 | 8/2018 | Al-Yami et al. |
| 2018/0265763 A1 | 9/2018 | Leotaud et al. |

FOREIGN PATENT DOCUMENTS

| | | |
|---|---|---|
| CA | 2594108 A1 | 9/2008 |
| CA | 2810345 A1 | 3/2012 |
| CA | 2745017 A1 | 12/2012 |
| CN | 102120158 A | 7/2011 |
| CN | 101240218 B | 12/2011 |
| CN | 102041138 B | 12/2011 |
| CN | 102321461 A | 1/2012 |
| CN | 102382697 A | 3/2012 |
| CN | 102373042 B | 8/2013 |
| CN | 102464974 B | 8/2013 |
| CN | 103320203 A | 9/2013 |
| CN | 102500141 B | 1/2014 |
| CN | 103571599 A | 2/2014 |
| CN | 102899152 B | 4/2014 |
| CN | 102899154 B | 4/2014 |
| CN | 102977940 B | 11/2014 |
| CN | 104130839 A | 11/2014 |
| CN | 104559954 A | 4/2015 |
| CN | 103351925 B | 7/2015 |
| CN | 102373053 B | 8/2015 |
| CN | 103571578 B | 8/2015 |
| CN | 104830513 A | 8/2015 |
| CN | 104877749 A | 9/2015 |
| CN | 104910881 A | 9/2015 |
| CN | 105038737 A | 11/2015 |
| CN | 103757640 B | 12/2015 |
| CN | 105112036 A | 12/2015 |
| CN | 103773041 B | 1/2016 |
| CN | 105441051 A | 3/2016 |
| CN | 104449893 B | 5/2016 |
| CN | 103555304 B | 6/2016 |
| CN | 105623814 A | 6/2016 |
| CN | 105778992 A | 7/2016 |
| CN | 105861135 A | 8/2016 |
| EA | 001932 B1 | 10/2001 |
| EP | 108546 A2 | 5/1984 |
| EP | 243067 A2 | 10/1987 |
| EP | 265563 A1 | 5/1988 |
| EP | 296655 A1 | 12/1988 |
| EP | 315243 A1 | 5/1989 |
| EP | 331158 A2 | 9/1989 |
| EP | 395815 A1 | 11/1990 |
| EP | 1003829 B1 | 5/2004 |
| EP | 1213270 B1 | 2/2005 |
| EP | 2708586 A1 | 3/2014 |
| GB | 2205748 A | 12/1988 |
| GB | 2283036 A | 4/1995 |
| GB | 2343447 A | 5/2000 |
| JP | 07109472 A | 4/1995 |
| JP | 2006001789 A | 1/2006 |
| RE | 35163 E | 2/1996 |
| WO | 8911516 A1 | 11/1989 |
| WO | 9402565 A1 | 2/1994 |
| WO | 9530818 A1 | 11/1995 |
| WO | 9640836 A1 | 12/1996 |
| WO | 9730142 A1 | 8/1997 |
| WO | 9836151 A1 | 8/1998 |
| WO | 9907816 A1 | 2/1999 |
| WO | 9955634 A1 | 11/1999 |
| WO | 0123703 A1 | 4/2001 |
| WO | 03093641 A1 | 11/2003 |
| WO | 2004076561 A1 | 9/2004 |
| WO | 2006012622 A2 | 2/2006 |
| WO | 2006120151 A2 | 11/2006 |
| WO | 2007003885 A3 | 5/2007 |
| WO | 2007118328 A1 | 10/2007 |
| WO | 2008081158 A2 | 7/2008 |
| WO | 2009060405 A1 | 5/2009 |
| WO | 2009138383 A1 | 11/2009 |
| WO | 2010030275 A1 | 3/2010 |

(56) References Cited

FOREIGN PATENT DOCUMENTS

| | | |
|---|---|---|
| WO | 2012101594 A1 | 8/2012 |
| WO | 2012158645 A1 | 11/2012 |
| WO | 2013055843 A1 | 4/2013 |
| WO | 2013154435 A1 | 10/2013 |
| WO | 2014107391 A1 | 7/2014 |
| WO | 2014164381 A1 | 10/2014 |
| WO | 2014193507 A1 | 12/2014 |
| WO | 2015000077 A1 | 1/2015 |
| WO | 2015006101 A1 | 1/2015 |
| WO | 2015038117 A1 | 3/2015 |
| WO | 2015041649 A1 | 3/2015 |
| WO | 2016189062 A1 | 12/2016 |

OTHER PUBLICATIONS

U.S. Office Action dated Jul. 2, 2019 pertaining to U.S. Appl. No. 16/039,525, filed Jul. 19, 2018, 75 pgs.
U.S. Office Action dated Jul. 2, 2019 pertaining to U.S. Appl. No. 15/586,555, filed May 4, 2017, 92 pgs.
"Tridecyl Alcohol Ethoxylate," 2016, retrieved Jun. 28, 2019 from http://webcache.goggleusercontent.com/search?q=cache:OiTX5lz527kJ:https://emochemicals.com/Ethoxylates/Ethoxylates/TRIDECYL-ALCOHOL-ETHOXYLATE&hl=en&gl=us&strip=1&vwsrc=0 (Year: 2016).
Notice of Allowance and Fee(s) Due dated Jul. 22, 2019 pertaining to U.S. Appl. No. 15/922,065, filed Mar. 15, 2018, 27 pgs.
Notice of Allowance and Fee(s) Due dated Jul. 31, 2019 pertaining to U.S. Appl. No. 15/628,892, filed Jun. 21, 2017, 19 pgs.
Office Action dated Aug. 12, 2019 pertaining to U.S. Appl. No. 15/612,397, filed Jun. 2, 2017, 45 pgs.
Final Rejection dated Aug. 5, 2019 pertaining to U.S. Appl. No. 15/586,543, filed May 4, 2017, 38 pgs.
Office Action dated Jul. 30, 2019 pertaining to U.S. Appl. No. 15/581,136, filed Apr. 28, 2017, 29 pgs.
Office Action dated Apr. 4, 2019 pertaining to U.S. Appl. No. 15/586,543, filed May 4, 2017, 23 pgs.
Office Action dated Apr. 8, 2019 pertaining to U.S. Appl. No. 15/660,118, filed Jul. 26, 2017, 76 pgs.
U.S. Office Action dated Apr. 11, 2019 pertaining to U.S. Appl. No. 15/628,892, filed Jun. 21, 2017, 34 pgs.
U.S. Notice of Allowance dated Apr. 24, 2019 pertaining to U.S. Appl. No. 15/485,724, filed Apr. 12, 2017, 23 pgs.
U.S. Notice of Allowance dated Apr. 26, 2019 pertaining to U.S. Appl. No. 15/489,930, filed Apr. 18, 2017, 14 pgs.
Notice of Allowance and Fee(s) Due dated May 15, 2019 pertaining to U.S. Appl. No. 15/922,077, filed Mar. 15, 2018, 27 pgs.
GCC Examination Report dated Mar. 4, 2020 for Application No. 2018-38749 filed Feb. 3, 2018.
Notice of Allowance and Fee(s) Due dated Aug. 21, 2019 pertaining to U.S. Appl. No. 15/920,879, filed Mar. 14, 2018, 13 pgs.
Notice of Allowance and Fee(s) Due dated Aug. 28, 2019 pertaining to U.S. Appl. No. 16/451,167, filed Jun. 25, 2019, 43 pgs.
Examination Report for Application No. GC2018-34707 dated Jul. 21, 2019.
Examination Report for Application No. GC2018-34710 dated Jul. 22, 2019.
Examination Report for Application No. GC2018-34701 dated Jul. 29, 2019.
Examination Report for U.S. Pat. No. 3,052,276 dated Sep. 5, 2019.
Examination Report for Application No. GC2018-34699 dated Aug. 21, 2019.
Examination Report for Application No. GC2018-34711 dated Jul. 28, 2019.
Examination Report for Application No. GC2018-34700 dated Aug. 21, 2019.
Notice of Allowance and Fee(s) Due dated Oct. 11, 2019 pertaining to U.S. Appl. No. 16/037,493, filed Jul. 17, 2018, 17 pgs.
Notice of Allowance and Fee(s) Due dated Oct. 2, 2019 pertaining to U.S. Appl. No. 15/489,854, filed Apr. 18, 2017, 13 pgs.
Nelson, E.B. Well cementing, vol. 28, pp. 5-25 through 5-34, ISBN 0-444-88751-2 (Year: 1990).
Office Action dated Dec. 5, 2019 pertaining to U.S. Appl. No. 15/496,794, filed Apr. 25, 2017, 34 pgs.
Office Action dated Dec. 13, 2019 pertaining to U.S. Appl. No. 15/586,543, filed May 4, 2017, 27 pgs.
Office Action dated Dec. 19, 2019 pertaining to U.S. Appl. No. 15/612,397, filed Jun. 2, 2017, 34 pgs.
Office Action dated Dec. 13, 2019 pertaining to U.S. Appl. No. 15/581,136, filed Apr. 28, 2017, 33 pgs.
Notice of Allowance and Fee(s) Due dated Jan. 17, 2020 pertaining to U.S. Appl. No. 15/660,118, filed Jul. 26, 2017, 10 pgs.
Notice of Allowance and Fee(s) Due dated Jan. 9, 2020 pertaining to U.S. Appl. No. 16/002,669, filed Jun. 7, 2018, 35 pgs.
Examination Report for Application No. GC2018-34705 dated Oct. 27, 2019.
Examination Report for Application No. GC2018-34700 dated Dec. 18, 2019.
Examination Report for Application No. GC2018-34699 dated Dec. 31, 2019.
Examination Report for Application No. GC2018-34697 dated Dec. 26, 2019.
Notice of Allowance and Fee(s) Due dated Mar. 5, 2020 pertaining to U.S. Appl. No. 16/002,669, filed Jun. 7, 2018, 12 pgs.
Office Action dated Feb. 27, 2020 pertaining to U.S. Appl. No. 16/202,600, filed Nov. 28, 2018, 22 pgs.
Akkutlu et al., "Molecular Dynamics Simulation of Adsorpotion from Microemulsions and Surfactant Micellar Solutions at Solid-Liquid, Liquid-Liquid and Gas-Liquid Interfaces", Tech Connector World Innovation Conference & Expo, Jun. 15-18, 2014, Washington D.C.
Fraser, Greig, "Method for Determining the Bioconcentration Factor of Linear Alcohol Ethoxylates", SPE Offshore Europe Oil and Gas Conference and Exhibition, Aberdeen, GB, Sep. 8-11, 2009, Society of Petroleum Engineers.
Inoue et al., "Interactions Between Engine Oil Additive", J. Japan Petrol. Inst., 1981, 24 (2), 101-107.
Joshi et al., "Physiochemical Behaviour of Ternary System Based on Coconut Oil/C12/E8/n-pentanol/Water", J. Surface Sci. Technol., 2013, 29 (1-2), 1-13.
Lim, Jongchoo, "Solubilization of Mixture of Hydrocarbon Oils by C12e 8 Nonionic Surfactant Solution", Journal of the Korean Industrial and Engineering Chemistry, 2008, 19, 59-65.
Luan et al., "Foaming Property for Anionic-Nonionic Gemini Surfactant of Polyalkoxylated Ether Sulfonate", Oilfield Chemistry, Tsinghua Tongfang Knowledge Network Technology Co., Ltd., 2006.
Min et al., "Research on Coking Dust Wettability of Strong Cohesiveness and Easy Mudding", Safety in Coal Mines, Tsinghua Tongfang Knowledge Network Technology Co., Ltd., 2006.
Mitchell et al., "Measurement of HTHP Fluid-Loss Equipment and Test Fluids with Thermocouples", American Association of Drilling Engineers, AADE Drilling Fluids Conference, Houston TX, Apr. 6-7, 2004.
Nelson, Erik B., "Well Cementing Fundamentals", Oilfield Review, Summer 2012, vol. 24, No. 2, 59-60, Schlumberger.
Paswan et al., "Development of Jatropha oil-in-water emulsion drilling mud system", Journal of Petroleum Science and Engineering, 2016, vol. 144, p. 10-18.
Sun et al., "Synthesis and Salt Tolerance Determination of Aliphatic Alcohol Polyoxyethylene Ethers Sulfonate Series", Journal of Chemical Industry & Engineering, Tsinghua Tongfang Knowledge Network Technology Co., Ltd., 2006.
International Search Report and Written Opinion pertaining to International Application No. PCT/U52018/014986 filed Jan. 24, 2018.
International Search Report and Written Opinion pertaining to International Application No. PCT/U52018/015191 filed Jan. 25, 2018.
International Search Report and Written Opinion Petaining to International Application No. PCT/U52018/015140.

(56) References Cited

OTHER PUBLICATIONS

International Search Report and Written Opinion dated Apr. 3. 2018 Petaining to International Application No. PCT/US2018/016182 pp. 1-13.
Non-Final Office Action dated Jan. 16, 2018 pertaining to U.S. Appl. No. 15/485,479, filed Apr. 12, 2017.
Non-Final Office Action dated Apr. 30, 2018 pertaining to U.S. Appl. No. 15/586,543, filed May 4, 2017.
Non-Final Office Action dated May 1, 2018 pertaining to U.S. Appl. No. 15/496,794, filed Apr. 25, 2017.
International Search Report and Written Opinion dated Apr. 3, 2018, pertaining to International Application PCT/US2018/016447, filed Feb. 1, 2018, 14 pages.
International Search Report and Written Opinion dated Apr. 20, 2018, pertaining to International Application PCT/US2018/016365, filed Feb. 1, 2018, 16 pages.
International Search Report and Written Opinion dated Apr. 20, 2018, pertaining to International Application PCT/US2018/016414, filed Feb. 1, 2018, 14 pages.
International Search Report and Written Opinion dated Apr. 16, 2018, pertaining to International Application PCT/US2018/016415, filed Feb. 1, 2018, 13 pages.
Shell Chemicals, HLB numbers, solvent miscibility and emulsification characteristics of NEODOL ethoxylates, retrieved Apr. 26, 2018 from https://www.shel.com/business-customers/chemicals/our-products/higher-olefins-and-derivatives/neodol-alchols-and-ethoxylates/_jcr_contents/par/tabbedcontent/tab_1780231844/textimage.
Non-Final Office Action dated May 4, 2018 pertaining to U.S. Appl. No. 15/628,892, filed Jun. 21, 2017.
International Search Report and Written Opinion dated May 8, 2018 pertaining to International Application No. PCT/US2018/015631.
International Search Report and Written Opinion dated May 14, 2018 pertaining to International Application No. PCT/US2018/015640 filed Jan. 29, 2018, 16 pages.
International Search Report and Written Opinion dated May 9, 2018 pertaining to International Application No. PCT/US2018/015638 filed Jan. 29, 2018, 15 pages.
Non-Final Office Action dated May 25, 2018 pertaining to U.S. Appl. No. 15/485,724, 6 pages.
International Search Report and Written Opinion dated May 29, 2018 pertaining to International Application No. PCT/US2018/015207 filed Jan. 25, 2018, 15 pages.
International Search Report and Written Opinion dated May 25, 2018, pertaining to International Application No. PCT/US2018/016167, filed Jan. 31, 2018, 20 pages.
Office Action pertaining to U.S. Appl. No. 15/489,927 dated Jul. 6, 2018.
Office Action pertaining to U.S. Appl. No. 16/002,672 dated Sep. 14, 2018.
Office Action pertaining to. U.S. Appl. No. 16/002,669 dated Sep. 21, 2018.
Final Rejection dated Oct. 9, 2018 pertaining to U.S. Appl. No. 15/496,794.
Sabicol TA Series Synthetic Alcohol Ethoxylates, SGS, 2013, pp. 1-3, retrieved Sep. 28, 2018 from http://www.latro.com.tr/upload/1499842623-t2.pdf (Year:2013).
Office Action dated Dec. 12, 2018 pertaining to U.S. Appl. No. 15/581,136, filed Apr. 28, 2017.
Office Action dated Dec. 19, 2018 pertaining to U.S. Appl. No. 15/489,930, filed Apr. 18, 2017.
Notice of Allowance and Fee(s) Due dated Jan. 8, 2019 pertaining to U.S. Appl. No. 15/485,479, filed Apr. 12, 2017.
Office Action dated Jan. 17, 2019 pertaining to U.S. Appl. No. 15/485,724, filed Apr. 12, 2017.
Office Action dated Feb. 11, 2019 pertaining to U.S. Appl. No. 15/496,794, filed Apr. 25, 2017, 16 pgs.
Office Action dated Feb. 11, 2019 pertaining to U.S. Appl. No. 15/920,879, filed Mar. 14, 2018, 38 pgs.
Office Action dated Feb. 7, 2019 pertaining to U.S. Appl. No. 16/002,669, filed Jun. 7, 2018, 54 pgs.
Office Action dated Feb. 21, 2019 pertaining to U.S. Appl. No. 16/037,493, filed Jul. 17, 2018, 52 pgs.
Office Action dated Jan. 24, 2019 pertaining to U.S. Appl. No. 15/489,854, filed Apr. 18, 2017, 46 pgs.
Office Action dated Feb. 5, 2019 pertaining to U.S. Appl. No. 15/612,397, filed Jun. 2, 2017, 67 pgs.
Office Action dated Feb. 27, 2019 pertaining to U.S. Appl. No. 15/922,077, filed Mar. 15, 2018, 69 pgs.
Notice of Allowance and Fee(s) Due dated Feb. 21, 2019 pertaining to U.S. Appl. No. 15/489,927, filed Apr. 18, 2017, 27 pgs.
Office Action dated Mar. 13, 2019 pertaining to U.S. Appl. No. 15/922,065, filed Mar. 15, 2018, 77 pgs.
Office Action dated Mar. 27, 2019 pertaining to U.S. Appl. No. 15/581,136, filed Apr. 28, 2017, 20 pgs.
Office Action dated Oct. 22, 2019 pertaining to U.S. Appl. No. 16/039,525, filed Jul. 19, 2018, 32 pgs.
Notice of Allowance and Fee(s) Due dated Nov. 5, 2019 pertaining to U.S. Appl. No. 15/586,555, filed May 1, 2017, 29 pg.
Office Action dated Oct. 23, 2019 pertaining to U.S. Appl. No. 15/660,118, filed Jul. 26, 2017, 45 pgs.
Office Action dated Oct. 24, 2019 pertaining to U.S. Appl. No. 16/202,600, filed Nov. 28, 2018, 84 pgs.
Notice of Allowance and Fee(s) due dated Mar. 3, 2020 pertaining to U.S. Appl. No. 16/039,525, filed Jul. 19, 2018, 23 pgs.
Office Action dated Mar. 18, 2020 pertaining to U.S. Appl. No. 15/581,136, filed Apr. 28, 2017, 29 pgs.
Notice of Allowance and Fee(s) due dated Mar. 26, 2020 pertaining to U.S. Appl. No. 15/612,397, filed Jun. 2, 2017, 26 pgs.
Office Action dated Mar. 30, 2020 pertaining to U.S. Appl. No. 16/696,166, filed Nov. 26, 2019, 56 pgs.
Office Action dated Apr. 14, 2020 pertaining to U.S. Appl. No. 15/496,794, filed Apr. 25, 2017, 47 pgs.
Office Action dated Apr. 22, 2020 pertaining to U.S. Appl. No. 15/586,543, filed May 4, 2017, 33 pgs.
Examination Report pertaining to Application No. GC 2018-34707 dated Dec. 17, 2019.
International Preliminary Report on Patentability for Application No. PCT/US2018/016415 dated Aug. 15, 2019.
Notice of Allowance dated Jun. 29, 2020 pertaining to U.S. Appl. No. 15/581,136, filed Apr. 28, 2017, 15 pgs.
Notice of Allowance dated Jul. 22, 2020 pertaining to U.S. Appl. No. 15/586,543, filed May 4, 2017, 6 pgs.
Office Action dated Jul. 13, 2020 pertaining to U.S. Appl. No. 16/653,357, filed Oct. 15, 2019, 57 pgs.
Notice of Allowance dated Jul. 29, 2020 pertaining to U.S. Appl. No. 16/696,166, filed Nov. 26, 2019, 11 pgs.
Office Action dated Jun. 10, 2019 pertaining to U.S. Appl. No. 15/920,879, filed Mar. 14, 2018, 29 pgs.
Office Action dated Jun. 12, 2019 pertaining to U.S. Appl. No. 16/002,669, filed Jun. 7, 2018, 33 pgs.
Office Action dated Jun. 14, 2019 pertaining to U.S. Appl. No. 15/489,854, filed Apr. 18, 2017, 20 pgs.
Office Action dated Jun. 24, 2019 pertaining to U.S. Appl. No. 16/037,493, filed Jul. 17, 2018, 31 pgs.
Office Action dated Sep. 24, 2020 pertaining to U.S. Appl. No. 16/381,783 filed Apr. 11, 2019, 100 pgs.
Office Action dated Sep. 29, 2020 pertaining to U.S. Appl. No. 16/735,073 filed Jan. 6, 2020, 61 pgs.
Office Action dated Sep. 30, 2020 pertaining to U.S. Appl. No. 16/774,410 filed Jan. 28, 2020, 63 pgs.
Office Action dated Oct. 8, 2020 pertaining to U.S. Appl. No. 16/298,243 filed Mar. 11, 2019, 106 pgs.
Office Action dated Oct. 5, 2020 pertaining to U.S. Appl. No. 16/856,288 filed Apr. 31, 2020, 49 pgs.
Dffice Action dated Oct. 8, 2020 pertaining to U.S. Appl. No. 16/298,211 filed Mar. 11, 2019, 91 pgs.

* cited by examiner

ENHANCED FILTRATION CONTROL PACKAGES, WELLBORE SERVICING FLUIDS UTILIZING THE SAME, AND METHODS OF MAINTAINING THE STRUCTURE OF A WELLBORE

CROSS REFERENCE TO RELATED APPLICATIONS

This application is a continuation application of U.S. patent application Ser. No. 15/489,927 filed Apr. 18, 2017, which claims priority to U.S. Provisional Patent Application Ser. No. 62/454,189 filed Feb. 3, 2017, and to U.S. Provisional Patent Application Ser. No. 62/454,192 filed Feb. 3, 2017, both of which are incorporated by reference in their entirety.

TECHNICAL FIELD

Embodiments of the present disclosure generally relate to wellbore servicing fluids. In particular, the present disclosure relates to wellbore servicing fluids with enhanced filtration control packages.

BACKGROUND

During drilling operations, a drilling mud, also referred to as a drilling fluid, may be circulated through the wellbore to aid in the drilling process. These drilling muds cool the drill bit, remove formation cuttings from the wellbore, and can support the structure of the wellbore, preventing collapse. Drilling muds that support the structure of the wellbore and prevent collapse are also known as wellbore servicing fluids.

However, during circulation, drilling muds cannot be contained within the wellbore. Drilling muds filter into the surrounding formation, that is, the drilling muds seep into the formation through the pores and channels of the formation material. Over time, this filtration results in a reduction in the amount of fluid being circulated through the wellbore. This phenomenon is known as fluid loss. Fluid loss can be especially problematic in the case of wellbore servicing fluids designed to support the structure of the wellbore and prevent collapse. Fluid loss in wellbore servicing fluids can cause the collapse of the wellbore, resulting in costly and time intensive re-drilling operations.

SUMMARY

Accordingly, there exists a need for wellbore servicing fluids designed to limit fluid loss and control filtration of the fluid into the surrounding formation. The present embodiments address these needs by providing filtration control packages that limit fluid loss.

More specifically, the present embodiments are related to filtration control packages, wellbore servicing fluids comprising those filtration control packages, and methods of using those wellbore servicing fluids. The filtration control packages of the current disclosure typically consist of one or more carboxylic acids and either an ethoxylated alcohol compound or a polyethylene glycol.

For example, in one embodiment of the present disclosure, a filtration control package may comprise at least one carboxylic acid and an ethoxylated alcohol compound. The carboxylic acid may have from 14 to 20 carbon atoms. The ethoxylated alcohol compound may have a general formula R—$(OCH_2CH_2)_x$—OH, where R is a hydrocarbon having from 10 to 16 atoms and x is an integer from 6 to 9. The ethoxylated alcohol compound may have a hydrophilic-lipophilic balance of from 8.0 to 16.0.

Embodiments of the present disclosure are also directed to filtration control packages comprising at least one carboxylic acid and a polyethylene glycol. The carboxylic acid may have from 8 to 20 carbon atoms and the polyethylene glycol may have a mass average molar mass ($M_w$) of less than or equal to 1500 daltons.

In yet another embodiment of the present disclosure, a wellbore servicing fluid comprises an aqueous base fluid, one or more alkali metal or alkali earth metal salts, at least one viscosifier, and a filtration control package. The filtration control package may comprise a carboxylic acid and an ethoxylated alcohol compound. Alternatively, the filtration control package may comprise a polyethylene glycol.

Additional features and advantages of the described embodiments will be set forth in the detailed description infra, and in part will be readily apparent to those skilled in the art from that description or recognized by practicing the described embodiments, including the detailed description provided infra as well as the claims.

DETAILED DESCRIPTION

In one embodiment, a filtration control package comprises at least one carboxylic acid, and at least one ethoxylated alcohol compound. The at least one carboxylic acid may have from 8 to 20 carbon atoms and the ethoxylated alcohol compound may have the general formula R—$(OCH_2CH_2)_x$—OH, where R is a hydrocarbon group having from 10 to 16 carbon atoms and x is an integer from 6 to 9. The ethoxylated alcohol compound may have a hydrophilic-lipophilic balance of from 8.0 to 16.0.

In another embodiment, a filtration control package comprises at least one carboxylic acid and polyethylene glycol. The carboxylic acid may have from 8 to 20 carbon atoms and the polyethylene glycol may have a mass average molar mass ($M_w$) less than or equal to 1500 daltons. The filtration control package may comprise from 30 wt. % to 70 wt. % of at least one carboxylic acid and from 30 wt. % to 70 wt. % of polyethylene glycol.

Filtration control packages of the present disclosure may be added to wellbore servicing fluids to reduce fluid loss in the wellbore servicing fluid. Wellbore servicing fluids of the present disclosure, comprising filtration control packages of the present disclosure, exhibit a fluid loss of less than or equal to 20 cubic centimeters ($cm^3$) over 30 minutes as measured by American Petroleum Institute Recommended Practice 13 B-1, incorporated by reference in its entirety.

In one or more embodiments, a wellbore servicing fluid comprises an aqueous base fluid, one or more alkali metal or alkali earth metal salts, at least one viscosifier, and a filtration control package comprising at least one carboxylic acid and an ethoxylated alcohol compound. The at least one carboxylic acid may have from 8 to 20 carbon atoms and the ethoxylated alcohol compound may have the general formula R—$(OCH_2HC_2)_x$—OH, where R is a hydrocarbon group having from 10 to 16 carbon atoms and x is an integer from 6 to 9. The ethoxylated alcohol compound may have a hydrophilic-lipophilic balance value from 8.0 to 16.0. The carboxylic acid may be present in an amount less than or equal to 30 pounds per barrel (ppb) of wellbore servicing fluid. As used in the present disclosure, a barrel is a unit of volume equal to 42 gallons or 159 liters. The ethoxylated alcohol compound may also be present in an amount less than or equal to 30 ppb total wellbore servicing fluid.

In one or more embodiments, a wellbore servicing fluid comprises an aqueous base fluid, one or more alkali metal or alkali earth metal salts, at least one viscosifier, and a filtration control package comprising a polyethylene glycol. The polyethylene glycol may have a mass average molar mass ($M_w$) of less than or equal to 1500 daltons. The polyethylene glycol may be present in an amount less than or equal to 30 ppb of wellbore servicing fluid.

A wellbore is formed by inserting a drill string into a previously drilled hole. The drill string comprises a drill bit and drill collars. The drill string can then be rotated about an annular axis causing the drill bit to cut into the surrounding formation and, as a result, expands the hole. The surrounding formation may vary in composition and may include rock, dirt, sand, stone, or combinations thereof.

After the drill string expands the hole, a hollow cylinder, known as a casing, is lowered into the hole. The interior of the casing defines the annulus of the wellbore. The casing may vary in material, diameter, and length depending on the surrounding formation. The casing may be inserted into the hole in one piece or in segments.

The wellbore, including the casing, forms a circuit for fluids to flow. Fluids may be passed through the annulus, and then at the bottom of the casing, the fluids can be forced upward along the exterior of the casing via fluid pressure. Once the fluids return to the surface of the wellbore they may be reintroduced through the annulus or removed from the circuit. The wellbore comprises an outlet disposed at the surface of the wellbore which allows for the selective removal of fluids from the wellbore.

Drilling muds may be circulated through the circuit disposed in the wellbore. These drilling muds can accomplish many functions. For example, as the wellbore is expanded, formation cuttings need to be removed. Formation cuttings include, but are not limited to, any rock, dirt, sand or stone separated from the surrounding formation by the drill bit or otherwise present in the wellbore. A drilling mud can be used to remove these formation cuttings. The drilling mud may be passed through the annulus of the wellbore, forced up the exterior of the casing, and carried out the outlet.

Drilling muds may also be used to cool the drill bit. Drilling muds provide lubrication between the drill bit and the surrounding formation. This lubrication reduces the friction between the drill bit and the surrounding formation, and therefore reduces the amount of heat generated by the rotation of the drill bit. Additionally, drilling muds typically have a large specific heat, or heat capacity, relative to the drill bit and therefore can cool the drill bit by absorbing some amount of heat from the drill bit while maintaining a relatively stable temperature.

Drilling muds can also provide hydrostatic pressure in the wellbore to provide support to the walls of the wellbore and prevent collapse or caving in on the drill string. This function of maintaining the structure of the wellbore is extremely critical to the entire drilling process and failures to maintain the structure of the wellbore can result in costly and time intensive remedial measures. Drilling muds that maintain the structure of the wellbore are also known as wellbore servicing fluids.

Fluid loss occurs in almost any fluid that is circulated in the wellbore, but it is especially problematic in the case of wellbore servicing fluids. Fluid loss is a decrease in the amount of fluid being circulated through a wellbore and is caused by filtration. Fluid loss can result in a decrease in the hydrostatic pressure provided by the wellbore servicing fluid. A decrease in hydrostatic pressure provided by the wellbore servicing fluid can lead to wellbore instability and potentially a wellbore collapse.

Filtration occurs due to the permeability of the surrounding formation. The formation surrounding a wellbore naturally has some permeability; the ability of oil and gases to flow from the formation to the wellbore is dependent on the formation having some amount of permeability. However, the permeability of the surrounding formation allows for wellbore servicing fluids to filter into the formation from the wellbore. In the current disclosure, the filtration of a wellbore servicing fluid, and therefore the fluid loss of a wellbore servicing fluid, is limited by the addition of a filtration control package.

In one or more embodiments, a filtration control package may comprise an ethoxylated alcohol compound having a general formula R—$(OCH_2CH_2)_x$—OH where R is a hydrocarbon group having from 10 to 16 carbon atoms and x is an integer from 6 to 9. In some embodiments, R can be a saturated, unsaturated, linear, branched, or aromatic hydrocarbon such as, by way of non-limiting examples, —$C_{12}H_{25}$ or —$C_{10}H_{20}CH(CH_3)_2$. In other embodiments, R can be a hydrocarbon group having from 12 to 14 carbon atoms, a hydrocarbon group having exactly 13 carbon atoms, or even an iso tridecyl hydrocarbon group. In at least one embodiment, x is an integer from 7 to 9. In other embodiments, x may be 6, 7, 8, or 9. Without being limited by theory, it is believed that the carboxylic acid and the ethoxylated alcohol compound form a mixed micellar solution within wellbore servicing fluid, controlling filtration into the formation. In at least one embodiment, the carboxylic acid has from 14 to 20 carbon atoms.

Carboxylic acids of this size are conducive to forming mixed micellar solutions with the ethoxylated alcohol compounds of the present disclosure. In other embodiments, the carboxylic acid may have from 16 to 18 carbon atoms, from 14 to 16 carbon atoms, from 18 to 20 carbon atoms, from 14 to 18 carbon atoms, or even from 16 to 20 carbon atoms.

In at least one embodiment, a filtration control package may comprise from 30 wt. % to 70 wt. % of an ethoxylated alcohol compound. In other embodiments, a filtration control package may comprise from 30 wt. % to 65 wt. %, from 33 wt. % to 65 wt. %, from 35 wt. % to 65 wt. %, from 40 wt. % to 60 wt. %, from 45 wt. % to 55 wt. %, or from 48 wt. % to 52 wt. % of an ethoxylated alcohol compound.

The ethoxylated alcohol compound may be the condensation product of an ethoxylation reaction of a fatty alcohol. The fatty alcohol is an alcohol having a formula R—OH, where R is a saturated or unsaturated, linear, or branched hydrocarbon. In some embodiments, the fatty alcohol may be a naturally occurring fatty alcohol, such as a fatty alcohol obtained from natural sources such as animal products or vegetable oils. Non-limiting examples of naturally occurring fatty alcohols include, but are not limited to, capric alcohol, decyl alcohol, lauryl alcohol, myristyl alcohol, cetyl alcohol, stearyl alcohol, palmitoeyl alcohol, heptadecanol, nonadecyl alcohol, arachidyl alcohol, other naturally-occurring fatty alcohols, other synthetic alcohols, or combinations thereof.

In other embodiments, the fatty alcohol may be a synthetic fatty alcohol prepared from a synthesis reaction using one or more petroleum based precursors. For example, one embodiment may use the oligomerization of ethylene to produce a fatty alcohol having a formula R—OH where R is a saturated or unsaturated, linear or branched hydrocarbon having from 10 to 16 carbon atoms. The ethoxylation of fatty alcohol, R—OH to form the ethoxylated alcohol compound proceeds according to Equation 1:

$$ROH + xC_2H_4O \xrightarrow{KOH} R(OC_2H_4)_xOH \qquad \text{Eq. (1)}$$

where the fatty alcohol is reacted with ethylene oxide in a 1:x molar ratio yielding a relative mole of reaction product with x units of ethoxylation. As shown in Equation 1, the reaction product is an ethoxylated fatty alcohol according to having the general formula R—(OCH$_2$CH$_2$)$_x$—OH.

The ethoxylated alcohol compound of the filtration control package may have a hydrophilic-lipophilic balance (HLB) value from 8.0 to 16.0. The HLB value of a molecule is a measure of the degree to which it is hydrophilic or lipophilic. HLB value is calculated by the Griffin Method according to Equation 2:

$$HLB = 20 * \frac{M_h}{M} \qquad \text{Eq. (2)}$$

where $M_h$ is the molecular mass of the hydrophilic portion of the molecule and M is the molecular mass of the whole molecule. HLB values calculated using Equation 2 range from 0 to 20 in which a value of 0 indicates an absolutely hydrophobic/lipophilic molecule and a value of 20 corresponds to an absolutely hydrophilic/lipophobic molecule. Generally, molecules having an HLB less than 10 are lipid soluble, molecules having an HLB greater than 10 are water soluble, and molecules with an HLB between 3 and 16 have some surfactant/emulsifying properties.

In some embodiments, the ethoxylated alcohol compound of the filtration control package has an HLB value from 8 to 16. In other embodiments, the ethoxylated alcohol compound has an HLB value from 10 to 14, from 12 to 14, from 12 to 13.5, from 12.5 to 14.5, from 12.5 to 14, from 12.5 to 13.5, from 13 to 14.5, from 13 to 14, or even from 13 to 13.5.

In one or more embodiments, a wellbore servicing fluid comprises an aqueous base fluid, an alkali metal or alkali earth metal salt, at least one viscosifier, and a filtration control package comprising a carboxylic acid having from 8 to 20 carbon atoms and an ethoxylated alcohol compound with an HLB from 8.0 to 16.0, where neither the carboxylic acid nor the ethoxylated alcohol compound are present in the wellbore servicing fluid in an amount more than 30 ppb of wellbore servicing fluid.

The aqueous base fluid of the wellbore servicing fluid may include deionized, tap, distilled or fresh waters; natural, brackish and saturated salt waters; natural, salt dome, hydrocarbon formation produced or synthetic brines; filtered or untreated seawaters; mineral waters; and other potable and non-potable waters containing one or more dissolved salts, minerals or organic materials. Fresh water is often used because of potential issues with introducing unnecessary amounts of ions, metals, and minerals to the wellbore or surrounding formation.

Various amounts of aqueous base fluid were contemplated in wellbore servicing fluid embodiments. In one embodiment, a wellbore servicing fluid comprises from 210 ppb to 351 ppb of aqueous base fluid. In other embodiments, a wellbore servicing fluid may comprise from 230 ppb to 351 ppb, from 250 ppb to 351 ppb, from 270 ppb to 351 ppb, from 290 ppb to 351 ppb, from 300 ppb to 351 ppb, from 310 ppb to 340 ppb, from 320 ppb to 340 ppb, or from 310 ppb to 330 ppb of aqueous base fluid.

In one embodiment, a filtration control package comprises from 30 wt. % to 70 wt. % of a carboxylic acid. In other embodiments, a filtration control package may comprise from 30 wt. % to 65 wt. %, from 33 wt. % to 65 wt. %, from 35 wt. % to 65 wt. %, from 40 wt. % to 60 wt. %, from 45 wt. % to 55 wt. %, or from 48 wt. % to 52 wt. % of a carboxylic acid.

In one or more embodiments the at least one viscosifier may comprise xanthan gum polymer, bentonite, barite, minerals, polyacrylamides, polysaccharides, polyanionic cellulose, or combinations thereof. Xanathan gum polymer is a polysaccharide secreted by *Xanthomonas Campestris* bacteria. Viscosifiers such as xanathan gum polymer, as well as polyacrylamides, polysaccharides, polyanionic cellulose, bentonite, and barite increase the viscosity of the wellbore servicing fluid. In one embodiment, a wellbore servicing fluid comprises from 0.01 ppb to 30 ppb of at least one viscosifier. In one or more embodiments, the one or more viscosifier may comprise a solid having a specific gravity sufficient to increase the density of the wellbore servicing fluid without adversely affecting the flowability or other rheological properties of the spacer fluid In other embodiments, a wellbore servicing fluid may comprise from 0.01 ppb to 10 ppb, from 0.1 ppb to 30 ppb, from 0.1 ppb to 25 ppb, from 0.1 ppb to 20 ppb, from 1 ppb to 30 ppb, from 1 ppb to 25 ppb, from 1 ppb to 20 ppb, from 5 ppb to 30 ppb, from 5 ppb to 25 ppb, or from 5 ppb to 20 ppb from of at least one viscosifier.

In one or more embodiments, the one or more alkali metal or alkali earth metal salt comprises KCl. In other embodiments, the alkali metal or alkali earth metal salt comprises NaCl, CaCl$_2$, or combinations of NaCl, KCl, or CaCl$_2$.

In one or more embodiments, a wellbore servicing fluid comprises a carboxylic acid and an ethoxylated alcohol compound in an amount no more than 25 ppb each. In other embodiments, a wellbore servicing fluid comprises a carboxylic acid and an ethoxylated alcohol compound in an amount no more than 20 ppb each, no more than 18 ppb each, no more than 15 ppb each, or even no more than 10 ppb each.

Alternatively, a filtration control package may comprise a polyethylene glycol with a mass average molar mass ($M_w$) less than or equal to 1500 daltons. In other embodiments, a filtration control package comprises a polyethylene glycol with a mass average molar mass less than or equal to 1300 daltons, less than or equal to 1100 daltons, less than or equal to 1000 daltons, less than or equal to 900 daltons, less than or equal to 800 daltons, less than or equal to 700 daltons, or even less than or equal to 600 daltons.

In at least one embodiment, a filtration control package comprises from 30 wt. % to 70 wt. % of a polyethylene glycol. In other embodiments, a filtration control package comprises from 30 wt. % to 65 wt. %, from 33 wt. % to 65 wt. %, from 35 wt. % to 65 wt. %, from 40 wt. % to 60 wt. %, from 45 wt. % to 55 wt. %, or from 48 wt. % to 52 wt. % of a polyethylene glycol.

In one or more embodiments, a wellbore servicing fluid comprises an aqueous base fluid, an alkali metal or alkali earth metal salt and a filtration control package comprising a polyethylene glycol with a mass average molar mass ($M_w$) of less than or equal to 1500 daltons, where the amount of polyethylene glycol does not exceed 30 ppb of the wellbore servicing fluid. In one or more embodiments, a wellbore servicing fluid may further comprise a carboxylic acid having from 8 to 20 carbon atoms.

In one or more embodiments, a wellbore servicing fluid comprises a carboxylic acid and a polyethylene glycol in an amount no more than 25 ppb each. In other embodiments, a wellbore servicing fluid comprises a carboxylic acid and a polyethylene glycol in an amount no more than 20 ppb each, no more than 18 ppb each, no more than 15 ppb each, or even no more than 10 ppb each.

In one or more embodiments, a wellbore servicing fluid may be added to a wellbore and a drill string may be operated in the presence of the wellbore servicing fluid where the hydrostatic pressure provided by the wellbore servicing fluid maintains the structure of the wellbore and prophylax wellbore instability and wellbore collapse.

EXAMPLES

The subsequent examples illustrate one or more additional features of the present disclosure described supra. It should be understood that these examples are not intended to limit the scope of the disclosure or the appended claims in any manner.

In the subsequent examples, three different wellbore servicing fluids (Examples 1-3) as well as a Comparative Example wellbore servicing fluid were prepared. The fluid loss of these filtration control packages were then tested using API Recommended Practice 13B-1 at a time interval of 30 minutes.

According to API Recommended Practice 13B-1, fluid loss may be tested at low temperature and low pressure with a filter press having a mostly cylindrical drilling mud cell, the drilling mud cell having an inside diameter of 76.2 millimeters and a height of at least 64.0 millimeters. A sheet of 90 millimeter diameter filter paper is placed at the bottom of the cell and below the filter paper is a drain tube for discharging filtrate into a graduated cylinder. The filter press is sealed with gaskets and supported by a stand.

Sample wellbore servicing fluids are poured into the drilling mud cell of the filter press with 1 centimeter to 1.5 centimeters of room at the top of the drilling mud cell. Room at the top of the drilling mud cell is minimized to prevent $CO_2$ contamination. A graduated cylinder is then placed under the drain tube to collect filtrate. The filter press is then brought to a pressure of 690 kiloPascals within a tolerance of 35 kiloPascals within 30 seconds or less. The test period time interval begins when pressure is applied. After 30 minutes, the volume of filtrate collected is measured. This volume represents the fluid loss of the wellbore servicing fluid. The fluid loss results of the subsequent examples are detailed in Table 1.

Example 1

A wellbore servicing fluid was prepared in a mud cup using a multimixer. First, 328.45 grams of fresh water were added to the mud cup. Next, 1 gram of xanthan gum polymer was added to the mud cup and mixed for 10 minutes. Then, 2 grams of a mixture of carboxylic acids having from 16 to 18 carbon atoms were added to the mud cup and mixed for 5 minutes. Then 2 grams of an ethoxylated alcohol compound, $C_{13}H_{27}(OCH_2CH_2)_8OH$, were added to the mud cup and mixed for 5 minutes. Finally, 70.26 grams of barite were added to the mud cup and mixed for 5 minutes.

Example 2

A wellbore servicing fluid was prepared in a mud cup using a multimixer. First, 332.73 grams of fresh water were added to the mud cup. Next, 1 gram of xanthan gum polymer was added to the mud cup and mixed for 10 minutes. Then, 4 grams of a polyethylene glycol with a mass average molecular weight of 600 daltons were added to the mud cup and mixed for 5 minutes. Finally, 69.99 grams of barite were added to the mud cup and mixed for 5 minutes.

Example 3

A wellbore servicing fluid was prepared in a mud cup using a multimixer. First, 332.73 grams of fresh water were added to the mud cup. Next, 1 gram of xanthan gum polymer was added to the mud cup and mixed for 10 minutes. Then, 2 grams of a mixture of carboxylic acids having from 16 to 18 carbon atoms were added to the mud cup and mixed for 5 minutes. Then, 2 grams of a polyethylene glycol with a mass average molecular weight of 600 daltons were added to the mud cup and mixed for 5 minutes. Finally, 69.99 grams of barite were added to the mud cup and mixed for 5 minutes.

Comparative Example

A comparative example filtration control package was prepared in a mud cup using a multimixer. First, 332.73 grams of fresh water were added to the mud cup. Next, 1 gram of xanthan gum polymer was added to the mud cup and mixed for 10 minutes. Finally, 69.99 grams of barite were added to the mud cup and mixed for 5 minutes.

TABLE 1

| Wellbore Servicing Fluid Composition | Fluid Loss at 30 Minutes |
| --- | --- |
| Example 1 | 18.8 $cm^3$ |
| Example 2 | 15.0 $cm^3$ |
| Example 3 | 12.0 $cm^3$ |
| Comparative Example | 27.0 $cm^3$ |

As can be seen from the fluid loss data detailed in Table 1, the example wellbore servicing fluids had less fluid loss than the comparative example. The example wellbore servicing fluid with the greatest fluid loss, Example 1, still had less than 70% of the fluid loss of the Comparative Example. The example wellbore servicing fluid with the least fluid loss, Example 3, had less than 45% of the fluid loss of the Comparative Example.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should also be appreciated that the examples supply compositional ranges for various compositions, and that the total amount of isomers of a particular chemical composition can constitute a range.

Having described the subject matter of the present disclosure in detail and by reference to specific embodiments, it is noted that the various details described in this disclosure should not be taken to imply that these details relate to elements that are essential components of the various embodiments described in this disclosure. Rather, the claims appended infra should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claim subject matter. Therefore, it is intended that the specification cover the modifications and variations of the various described embodiments provided such modification and variations come within the scope of the appended claims and their equivalents.

A first aspect of the disclosure is directed to a filtration control package comprising at least one carboxylic acid having from 8 to 20 carbon atoms; and an ethoxylated alcohol compound having a general formula R—$(OCH_2CH_2)_x$—OH; where: R is a hydrocarbon group having from 10 to 16 carbon atoms; x is an integer from 6 to 9; and the ethoxylated alcohol compound has a hydrophilic-lipophilic balance value of from 8.0 to 16.0.

A second aspect of the disclosure includes the first aspect, where the filtration control package comprises from 30 wt. % to 70 wt. % of at least one carboxylic acid having from 8 to 20 carbon atoms.

A third aspect of the disclosure includes the first or second aspects, where the filtration comprises from 30 wt. % to 70 wt. % of an ethoxylated alcohol compound.

A fourth aspect of the disclosure includes any of the first through third aspects, where the at least one carboxylic acid has from 14 to 20 carbon atoms.

A fifth aspect of the disclosure includes any of the first through fourth aspects, where the at least one carboxylic acid has from 16 to 18 carbon atoms.

A sixth aspect of the disclosure includes any of the first through fifth aspects, where R is a hydrocarbon group having from 12 to 14 carbon atoms.

A seventh aspect of the disclosure includes any of the first through sixth aspects, where R is a branched isotridecyl hydrocarbon group.

An eighth aspect of the disclosure includes any of the first through seventh aspects, where x is 8.

A ninth aspect of the disclosure includes any of the first through eighth aspects, where the ethoxylated alcohol compound has a hydrophilic-lipophilic balance of from 10.0 to 14.0.

A tenth aspect of the disclosure includes any of the first through ninth aspects, where the ethoxylated alcohol compound has a hydrophilic-lipophilic balance value of from 13.0 to 13.5.

An eleventh aspect of the disclosure is directed to a filtration control package comprising from 30 wt. % to 70 wt. % of at least one carboxylic acid having from 8 to 20 carbon atoms; and from 30 wt. % to 70 wt. % of polyethylene glycol; where the polyethylene glycol has a mass average molar mass (MW) less than or equal to 1500 daltons.

A twelfth aspect of the disclosure includes the eleventh aspect, where the at least one carboxylic acid has from 12 to 20 carbon atoms.

A thirteenth aspect of the disclosure includes the eleventh and twelfth aspects, where the at least one carboxylic acid has from 16 to 18 carbon atoms.

A fourteenth aspect of the disclosure includes any of the eleventh through thirteenth aspects, where the polyethylene glycol has a mass average molar mass (MW) less than or equal to 800 daltons.

A fifteenth aspect of the disclosure is directed to a wellbore servicing fluid comprising: an aqueous base fluid; one or more alkali metal or alkali earth metal salts; at least one viscosifier; and a filtration control package comprising: at least one carboxylic acid having from 8 to 20 carbon atoms; an ethoxylated alcohol compound having a general formula, R—$(OCH_2CH_2)_x$—OH; where: R is a hydrocarbon group having from 10 to 16 carbon atoms; x is an integer from 6 to 9; and the ethoxylated alcohol compound has an hydrophilic-lipophilic balance value of from 8.0 to 16.0; and where the carboxylic acid and ethoxylated alcohol compound are present in the wellbore servicing fluid in an amount no more than 30 pounds per barrel of wellbore servicing fluid each.

A sixteenth aspect of the disclosure includes the fifteenth aspect, where the one or more alkali metal or alkali earth metal salts comprise NaCl, KCl, $CaCl_2$, or combinations thereof.

A seventeenth aspect of the disclosure includes the fifteenth and sixteenth aspects, where the carboxylic acid has from 14 to 20 carbon atoms.

An eighteenth aspect of the disclosure includes any of the fifteenth through seventeenth aspects, where the carboxylic acid has from 16 to 18 carbon atoms.

A nineteenth aspect of the disclosure includes any of the fifteenth through eighteenth aspects, where R is a hydrocarbon group having from 12 to 14 carbon atoms.

A twentieth aspect of the disclosure includes any of the fifteenth through nineteenth aspects, where R is a branched isotridecyl hydrocarbon group.

A twenty-first aspect of the disclosure includes any of the fifteenth through twentieth aspects, where x is 8.

A twenty-second aspect of the disclosure includes any of the fifteenth through twenty-one aspects, where the at least one viscosifier comprises xanthan gum polymer.

A twenty-third aspect of the disclosure includes any of the fifteenth through twenty-second aspects, where the ethoxylated alcohol compound has a hydrophilic-lipophilic balance value of from 10.0 to 14.0.

A twenty-fourth aspect of the disclosure includes any of the fifteenth through twenty-third aspects, where the ethoxylated alcohol compound has a hydrophilic-lipophilic balance value of from 13.0 to 13.5.

A twenty-fifth aspect of the disclosure includes any of the fifteenth through twenty-fourth aspects, where the aqueous base fluid is fresh water.

A twenty-sixth aspect of the disclosure includes any of the fifteenth through twenty-fifth aspects, where the carboxylic acid and ethoxylated alcohol compound are present in the wellbore servicing fluid in an amount no more than 20 pounds per barrel of wellbore servicing fluid each.

A twenty-seventh aspect of the disclosure is directed to a wellbore servicing fluid comprising: an aqueous base fluid; one or more alkali metal or alkali earth metal salts; at least one viscosifier; and a filtration control package comprising a polyethylene glycol with a mass average molar mass (Mw) less than or equal to 1500 daltons; where the amount of polyethylene glycol does not exceed 30 pounds per barrel of wellbore servicing fluid.

A twenty-eighth aspect of the disclosure includes the twenty-seventh aspect, further comprising a carboxylic acid having from 8 to 20 carbon atoms.

A twenty-ninth aspect of the disclosure includes the twenty-seventh and twenty-eighth aspects, where the carboxylic acid has from 14 to 20 carbon atoms.

A thirtieth aspect of the disclosure includes any of the twenty-seventh through twenty-ninth aspects, where the carboxylic acid has from 16 to 18 carbon atoms.

A thirty-first aspect of the disclosure includes any of the twenty-seventh through thirtieth aspects, where the polyethylene glycol has a mass average molar mass (MW) less than or equal to 800 daltons.

A thirty-second aspect of the disclosure includes any of the twenty-seventh through thirty-one aspects, where the polyethylene glycol is present in the wellbore servicing fluid in an amount no more than 20 pounds per barrel of wellbore servicing fluid.

A thirty-third aspect of the disclosure includes any of the twenty-seventh through thirty-second aspects, where the carboxylic acid is present in the wellbore servicing fluid in an amount no more than 30 pounds per barrel of wellbore servicing fluid.

A thirty-fourth aspect of the disclosure includes any of the twenty-seventh through thirty-third aspects, where the carboxylic acid is present in the wellbore servicing fluid in an amount no more than 20 pounds per barrel of wellbore servicing fluid.

A thirty-fifth aspect of the disclosure includes any of the twenty-seventh through thirty-fourth aspects, where the at least one viscosifier comprises xanthan gum polymer.

A thirty-sixth aspect of the disclosure includes any of the twenty-seventh through thirty-fifth aspects, where the one or more alkali metal or alkali earth metal salts comprise NaCl, KCl, $CaCl_2$, or combinations thereof.

A thirty-seventh aspect of the disclosure includes any of the fifteenth through thirty-sixth aspects, and is directed to adding a wellbore servicing fluid of the present disclosure and operating a drill string in the presence of the wellbore servicing fluid, maintaining the structure of the wellbore.

The invention claimed is:

1. A method of maintaining the structure of a wellbore, the method comprising:
   adding a wellbore servicing fluid to the wellbore; and
   operating a drill string in the presence of the wellbore servicing fluid, maintaining the structure of the wellbore; wherein
   the wellbore servicing fluid comprises an aqueous base fluid;
   xanthan gum polymer; and
   a filtration control package comprising:
      from 30 wt. % to 70 wt. % of at least one carboxylic acid having from 16 to 18 carbon atoms;
      from 30 wt. % to 70 wt. % of an ethoxylated alcohol compound having a general formula, R—$(OCH_2CH_2)x$—OH; where:

R is a hydrocarbon group having from 12 to 14 carbon atoms;
      x is an integer from 6 to 9; and
      the ethoxylated alcohol compound has a hydrophilic-lipophilic balance value of from 12.5 to 13.5; and
   where the carboxylic acid and ethoxylated alcohol compound are present in the wellbore servicing fluid in an amount no more than 30 pounds per barrel of wellbore servicing fluid each.

2. The method of claim 1, where R is a branched isotridecyl hydrocarbon group.

3. The method of claim 1, where x is 8.

4. The method of claim 1, where the aqueous base fluid is fresh water.

5. The method of claim 1, where the carboxylic acid and ethoxylated alcohol compound are present in the wellbore servicing fluid in an amount no more than 20 pounds per barrel of wellbore servicing fluid each.

6. The method of claim 1, further comprising one or more alkali metal or alkali earth metal salts.

* * * * *